US009840334B2

(12) United States Patent
Lucas

(10) Patent No.: US 9,840,334 B2
(45) Date of Patent: Dec. 12, 2017

(54) AUXILIARY POWER UNIT INLET DUCT ASSEMBLY FOR MITIGATING NOISE

(71) Applicant: Gulfstream Aerospace Corporation, Savannah, GA (US)

(72) Inventor: Mike Lucas, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 171 days.

(21) Appl. No.: 14/977,106

(22) Filed: Dec. 21, 2015

(65) Prior Publication Data

US 2017/0174356 A1     Jun. 22, 2017

(51) Int. Cl.
  *B64D 33/02*   (2006.01)
  *F02C 7/045*   (2006.01)
  *B64D 41/00*   (2006.01)

(52) U.S. Cl.
  CPC ............. *B64D 33/02* (2013.01); *B64D 41/00* (2013.01); *F02C 7/045* (2013.01); *B64D 2033/0206* (2013.01); *B64D 2033/0213* (2013.01); *B64D 2041/002* (2013.01); *F05D 2220/50* (2013.01)

(58) Field of Classification Search
  CPC ..... B64D 33/02; B64D 41/00; B64D 2033/02
  See application file for complete search history.

(56) References Cited

U.S. PATENT DOCUMENTS

| 3,821,999 | A  | * | 7/1974  | Guess   | G10K 11/172  |
|           |    |   |         |         | 181/296      |
| 4,049,074 | A  | * | 9/1977  | Kazin   | B64D 33/02   |
|           |    |   |         |         | 181/284      |
| 6,272,838 | B1 | * | 8/2001  | Harvell | F02C 7/042   |
|           |    |   |         |         | 244/58       |
| 6,349,899 | B1 | * | 2/2002  | Ralston | B64D 33/02   |
|           |    |   |         |         | 244/53 B     |
| 7,124,856 | B2 | * | 10/2006 | Kempton | B64D 33/02   |
|           |    |   |         |         | 181/210      |
| 7,540,142 | B2 | * | 6/2009  | Sheoran | F02C 7/042   |
|           |    |   |         |         | 137/15.1     |
| 8,079,550 | B2 | * | 12/2011 | Brill   | B64D 41/00   |
|           |    |   |         |         | 244/129.4    |
| 2005/0224635 | A1 | * | 10/2005 | Hein | B64D 33/02   |
|           |    |   |         |         | 244/10       |
| 2009/0169913 | A1 | * | 7/2009  | Mueller | B32B 5/26  |
|           |    |   |         |         | 428/608      |
| 2010/0068036 | A1 | * | 3/2010  | Brill   | B64D 41/00 |
|           |    |   |         |         | 415/119      |

(Continued)

*Primary Examiner* — Justin M Benedik
(74) *Attorney, Agent, or Firm* — LKGlobal | Lorenz & Kopf, LLP

(57) ABSTRACT

An auxiliary power unit inlet assembly includes an inlet duct having a first end and a second end. The auxiliary power unit inlet assembly further includes a door associated with the second end of the inlet duct. The door moves between a first position and a second position. The door closes the second end of the inlet duct when in the first position and permits air to enter the second end of the inlet duct when in the second position. The auxiliary power unit inlet assembly further includes a sound absorbing component mounted to the door and disposed proximate the inlet duct. The sound absorbing component is positioned at a location on the door such that a noise generated by the auxiliary power unit will directly impinge on the sound absorbing component.

20 Claims, 8 Drawing Sheets

(56) References Cited

U.S. PATENT DOCUMENTS

2010/0187039 A1* 7/2010 Holmgren .............. B32B 3/12
  181/284
2012/0292455 A1* 11/2012 DeDe .................... B64D 41/00
  244/53 B

* cited by examiner

AUXILIARY POWER UNIT INLET DUCT ASSEMBLY FOR MITIGATING NOISE

TECHNICAL FIELD

The present invention generally relates to aircraft and more particularly relates auxiliary power unit inlet duct assemblies equipped with door assemblies that are configured to mitigate noise generated by an auxiliary power unit.

BACKGROUND

Jet aircraft commonly include an auxiliary power unit. An auxiliary power unit provides electric power to the aircraft primarily during times when the jet engines are powered down. For example, when passengers are boarding the aircraft or deplaning, it is common to operate the auxiliary power unit to power the aircraft's systems.

An auxiliary power unit is a jet engine that is connected to a generator rather than to a propulsion system. Like all jet engines, the auxiliary power unit requires a supply of air. Because the auxiliary power unit is mounted inside of the fuselage instead of in a nacelle, it is not exposed to the ambient air around the aircraft and therefore it requires a dedicated pathway to supply it with air and a dedicated pathway to vent its exhaust. The pathway that supplies the auxiliary power unit with air commonly includes an inlet duct that connects the auxiliary power unit to an opening in the fuselage. The opening is covered by door that moves between a closed position and one or more open positions. While the door is in the closed position, air is precluded from entering the inlet duct. The door is kept closed while the auxiliary power unit is powered down. When the door is in an open position, air is able to enter the inlet duct and reach the auxiliary power unit. The door to the inlet duct is commonly mounted on a top portion of the fuselage. In some instances, the door is positioned near the vertical stabilizer.

An auxiliary power unit generates a substantial amount of noise while operating. The primary inlet noise produced by the auxiliary power unit has a frequency that corresponds with number of blades used in its compressor multiplied by the rotational speed. The higher the frequency of the noise, the more directional the noise will be. The high frequency noise propagates up the inlet duct in a direction opposite to the direction of the airflow and continues out of the inlet into the ambient airspace. Additionally, the high frequency noise will be redirected by solid reflective surfaces that it encounters as it travels outwardly through the inlet duct. When this high frequency, highly directional noise encounters the door to the inlet duct, it will be redirected in the same manner as a billiard ball encountering the bumpers of a pool table. Any person located in the path of this noise redirected by the inlet duct door will hear a persistent, shrill screech.

The door of the inlet duct commonly opens in a direction that faces towards a forward portion of the aircraft. If the passenger door to the aircraft is located on the same side of the aircraft as the door to the inlet duct, then passengers boarding or deplaning the aircraft while the auxiliary power unit is operating may experience a noisy environment if the noise emanating from the inlet duct is reflected off of the underside of the door towards them. This may be annoying and may make it difficult to carry on a conversation. This is an undesirable condition, especially in the case of a business jet where passengers have an elevated expectation of quiet and no enclosed walkway to shield them from the noise on their approach to the aircraft.

Additionally, the auxiliary power unit can also be operated in flight. The opening of the air inlet door is metered depending on airspeed and/or altitude. Noise from the air inlet can be broadcast to the ground under certain fight conditions and add to the overall noise signature of the airborne aircraft.

To address these situations, aircraft manufacturers commonly line the walls of the inlet duct with sound absorbing material. However, this solution can require an oversized inlet duct to accommodate the volume consumed by the sound absorbing material. Another method to reduce noise from the inlet duct is to add sound absorbing splitter vanes that span the cross-section of the duct. However, these vanes add flow resistance to the inlet system and may require a larger duct cross-section so as not to over restrict the airflow entering the auxiliary power unit. Thus, these solutions may add substantial cost, complexity, and weight to the aircraft.

It is desirable to provide an improved apparatus for reducing the sound generated by operation of the auxiliary power unit and transmitted by the inlet duct. Furthermore, other desirable features and characteristics will become apparent from the subsequent summary and detailed description and the appended claims, taken in conjunction with the accompanying drawings and the foregoing technical field and background.

BRIEF SUMMARY

An improved auxiliary power unit inlet assembly and auxiliary power unit door assembly for use with an auxiliary power unit on an aircraft are disclosed herein.

In a first non-limiting embodiment, the auxiliary power unit inlet assembly includes, but is not limited to, an inlet duct having a first end and a second end. The first end is configured for coupling to the auxiliary power unit. The auxiliary power unit inlet assembly further includes, but is not limited to, a door that is associated with the second end of the inlet duct. The door is configured to move between a first position and a second position. The door closes the second end of the inlet duct when the door is in the first position and the door permits air to enter the second end of the inlet duct when the door is in the second position. The auxiliary power unit inlet assembly still further includes, but is not limited to, a sound absorbing component that is mounted to the door and that is disposed proximate the inlet duct. The sound absorbing component is positioned at a location on the door such that a noise generated by the auxiliary power unit will directly impinge on the sound absorbing component.

In another non-limiting embodiment, the auxiliary power unit door assembly includes, but is not limited to, a door that is configured for mounting to an auxiliary power unit inlet duct. The door is configured to move between a first position and a second position when the door is mounted proximate the auxiliary power unit inlet duct. The door closes the auxiliary power unit inlet duct when the door is in the first position and the door permits air to enter the auxiliary power unit inlet duct when the door is in the second position. The auxiliary power unit door assembly further includes, but is not limited to, a sound absorbing component that is mounted to the door and that is disposed proximate the auxiliary power unit inlet duct when the door is mounted proximate the auxiliary power unit inlet duct. The sound absorbing component is positioned at a location on the door such that a noise generated by the auxiliary power unit will directly impinge on the sound absorbing component when the door is mounted proximate the auxiliary power unit inlet duct.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved auxiliary power unit inlet duct assembly is disclosed herein. In a non-limiting embodiment, the auxiliary power unit inlet duct assembly includes an inlet duct door assembly that has a sound absorbing component mounted to a portion of the door that faces the inlet of the inlet duct assembly. The sound absorbing component is positioned such that sound emanating from the inlet of the inlet duct assembly impinges on, and is at least partially absorbed by the sound absorbing component before being redirected towards the ambient environment. In conventional inlet duct assemblies that lack a sound absorbing component on the inlet duct door, the sound that emanates from the inlet will impinge directly on the door itself and be redirected, without dissipation, into the ambient environment. By mounting a sound absorbing component to the underside of the inlet duct door and placing it in the direct path of the sound emanating from the inlet, the energy level of the sound emanating from the inlet duct is reduced and, correspondingly, the volume of the sound emitted into the ambient environment is substantially diminished. Significantly, this diminution in the volume of the sound is achieved without making complicated and expensive modifications to the inlet duct itself, such as lining it with sound absorbing material and redesigning the inlet duct to accommodate such sound absorbing material.

A greater understanding of the auxiliary power unit inlet duct assembly and the inlet duct door assembly described above may be obtained through a review of the illustrations accompanying this application together with a review of the detailed description that follows.

Figure 1:
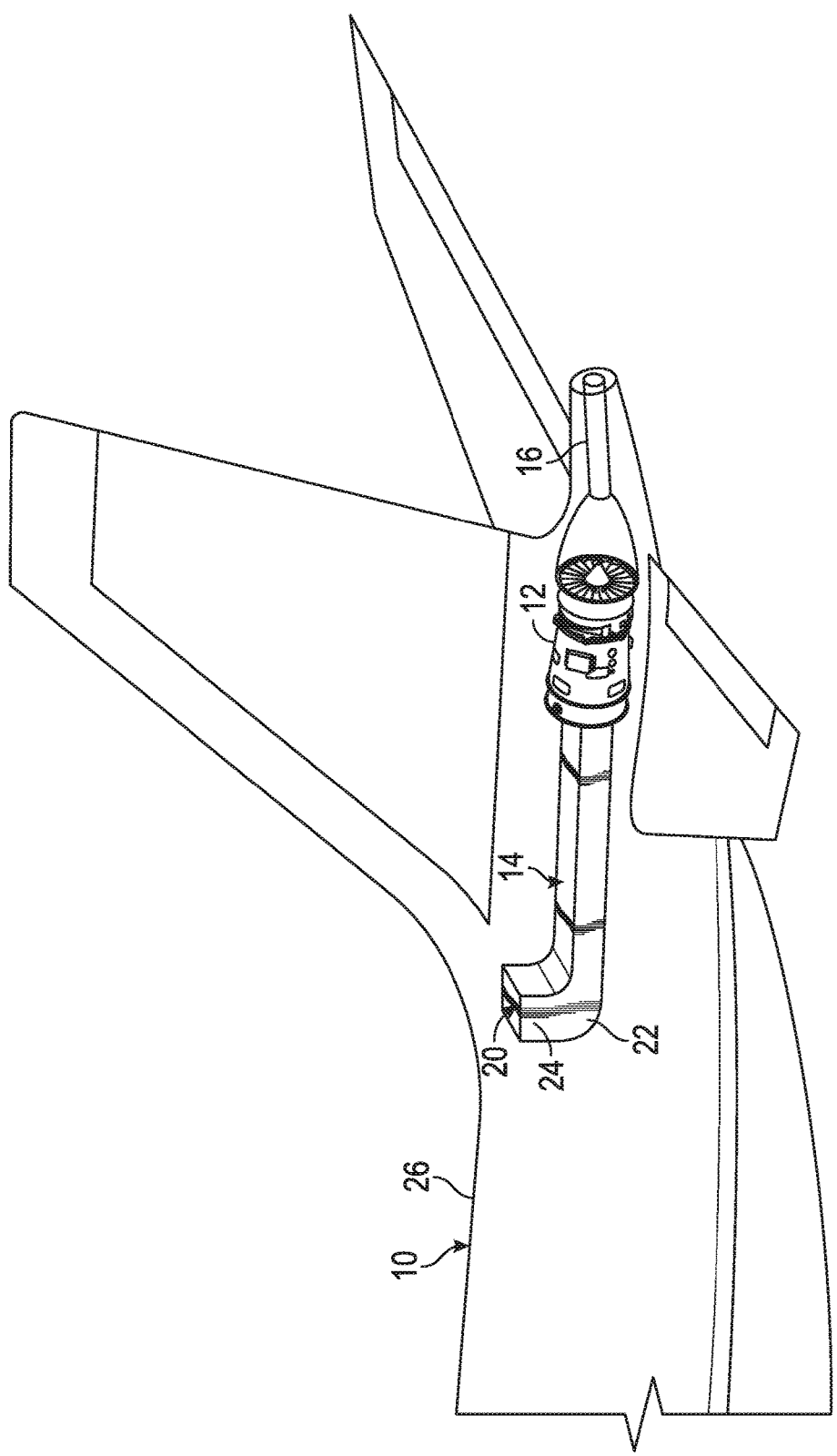
FIG. 1 is a perspective schematic view illustrating a tail section of an aircraft equipped with a non-limiting embodiment of an auxiliary power unit inlet duct assembly and inlet duct door assembly of the present disclosure.

FIG. 1 is a perspective schematic view of a rear portion of an aircraft 10 equipped with an auxiliary power unit 12. Auxiliary power unit 12 is fluidly coupled with the ambient environment outside of aircraft 10 by an inlet duct assembly 14 and an outlet duct 16. Ambient air enters auxiliary power unit 12 through inlet duct assembly 14 and, after combustion, is exhausted into the ambient environment via outlet duct 16.

Inlet duct assembly 14 includes a door assembly 20 and an inlet duct 22. Door assembly 20 is mounted to aircraft 10 proximate an end 24 of inlet duct 22 and is configured to move between an open position and a closed position. Inlet duct 22 and door assembly 20 are positioned such that door assembly 20 is integrated into an upper surface of fuselage 26 of aircraft 10. This provides inlet duct 22 with access to ambient air outside of aircraft 10 which will be needed when auxiliary power unit 12 is operating. When auxiliary power unit 12 is operating, door assembly 20 is opened. When in the open position, door assembly 20 permits ambient air to enter inlet duct 22. In some embodiments, door assembly 20 may be adjustable, meaning that it may be opened to a range of different angles and/or positions to let more or less air into inlet duct 22, depending on the air mass flow rate needed to operate auxiliary power unit 12. When in a closed position, door assembly 20 inhibits air from entering inlet duct 22. Door assembly 20 remains closed when auxiliary power unit 12 is not in operation to keep humidity, precipitation, and other particulate matter out of inlet duct 22 and to improve the aerodynamics of aircraft 10 during flight.

Figure 2:
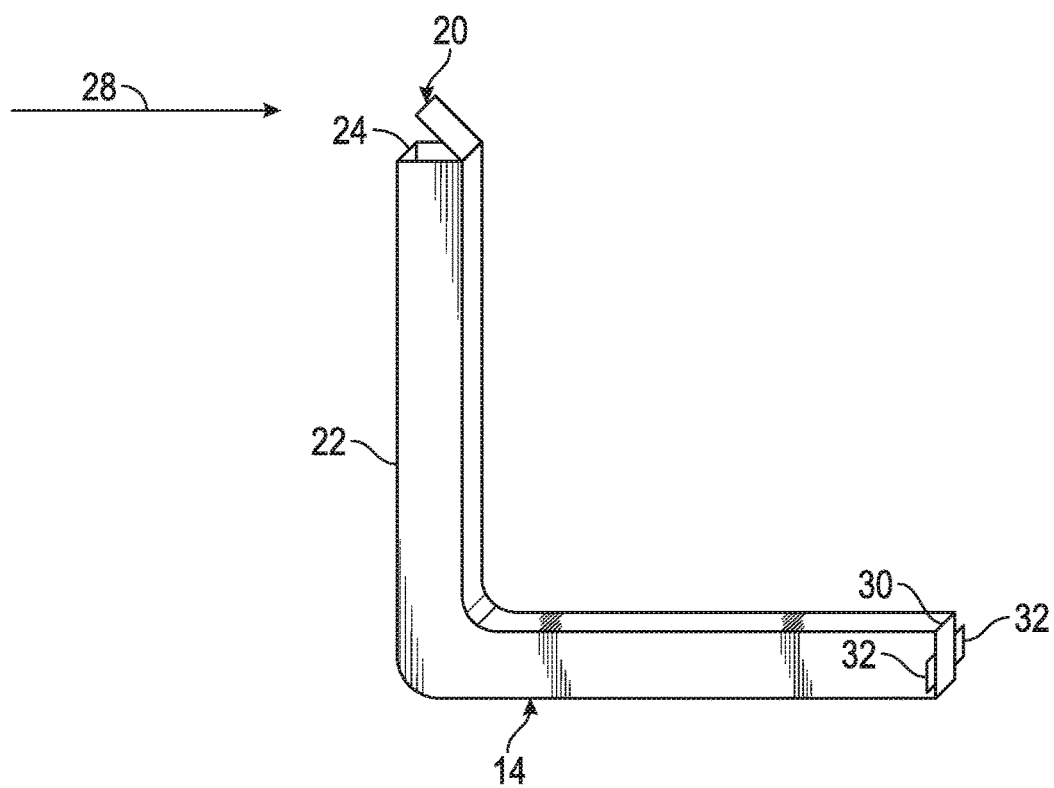
FIG. 2 is an expanded perspective view illustrating the inlet duct assembly and inlet duct door assembly of FIG. 1.

FIG. 2 is an expanded perspective view illustrating inlet duct assembly 14. In FIG. 2, door assembly 20 is illustrated in an open position. Door assembly 20 may be opened and closed using any mechanism effective to move door assembly 20 between an open and a closed position. For example and without limitation, a hydraulic actuator may be employed for this purpose. The mechanism used to move door assembly 20 between its opened and closed positions has been omitted from the figures for ease of illustration and to simplify the subject matter presented here.

With continuing reference to FIG. 1, when auxiliary power unit 12 is operated while aircraft 10 is in flight, air approaches door assembly 20 in the direction indicated by arrow 28. When this air encounters door assembly 20, a portion of this air will be redirected down into inlet duct 22 and routed to auxiliary power unit 12. To facilitate the capture of this air from the free stream, door assembly 20 may be configured as a scoop. In such a configuration, door assembly 20 would include side walls to help to capture and guide air from the free stream into inlet duct 22.

At an end 30 of inlet duct 22, two flanges 32 have been illustrated. Flanges 32 are used to couple end 30 to the inlet port (not shown) on auxiliary power unit 12 (see FIG. 1). While flanges have been illustrated in this embodiment of inlet duct assembly 14, those of ordinary skill in the art will appreciate that a wide variety of means may be employed to couple end 30 to auxiliary power unit 12 and that the use of any such alternative means would not be a departure from the teachings of the present disclosure.

Figure 3:
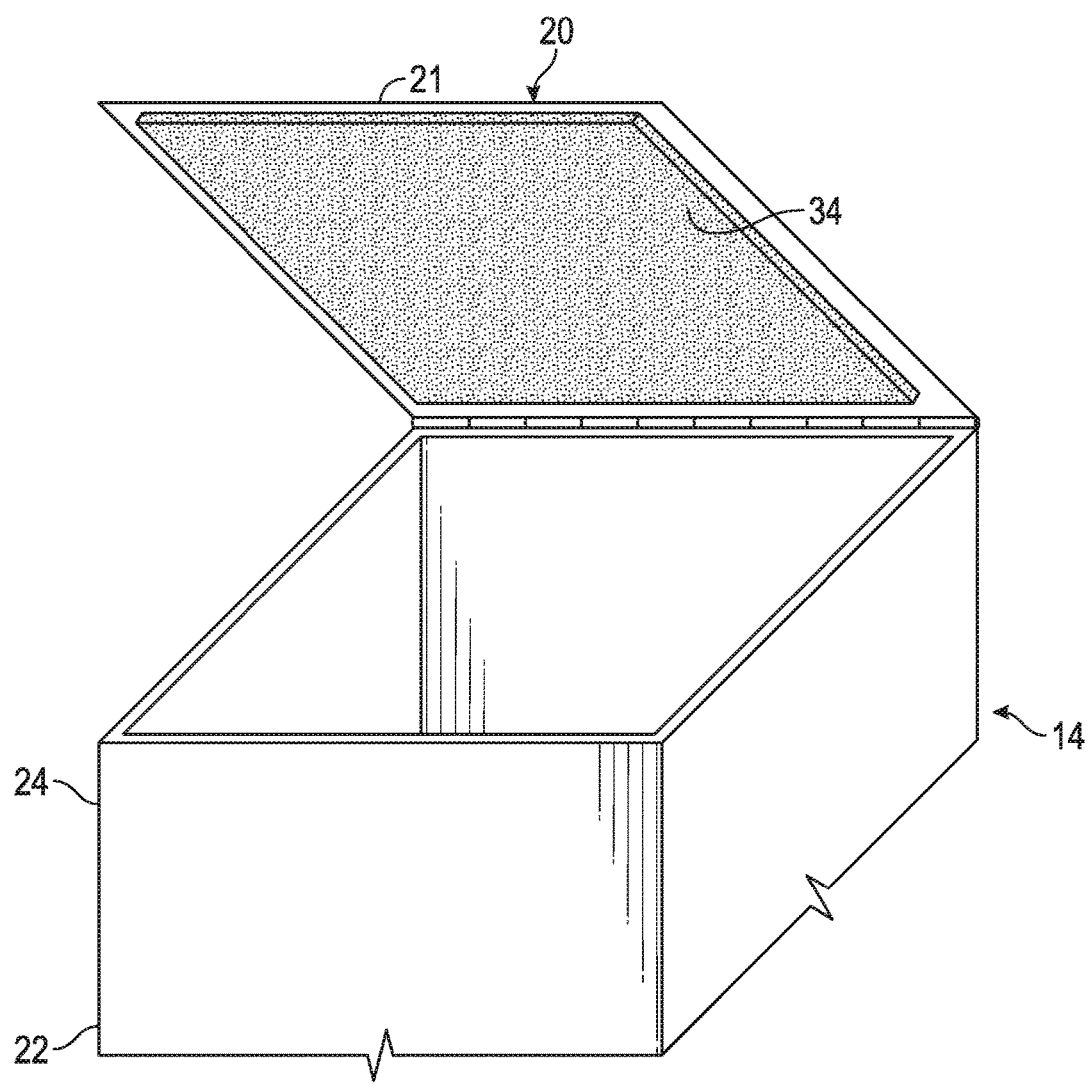
FIG. 3 is an expanded fragmentary perspective view illustrating a portion of the inlet duct assembly of FIG. 2 with the inlet duct door assembly disposed in an open position.
Figure 4:
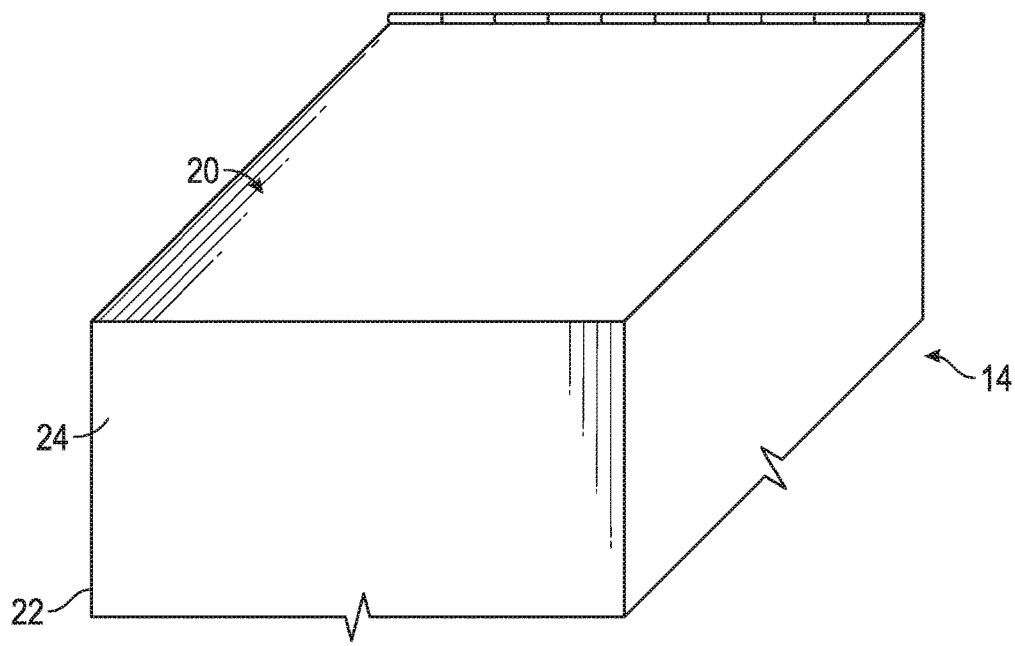
FIG. 4 is a perspective fragmentary view illustrating the portion of the inlet duct assembly of FIG. 3 with the inlet duct door assembly disposed in a closed position.

FIG. 3 is a fragmentary perspective view illustrating end 24 of inlet duct 22 of inlet duct assembly 14. With continuing reference to FIGS. 1-2, FIG. 3 is illustrated from the perspective of arrow 28, and depicts door assembly 20 in an open position. From the illustrated angle, the underside of door assembly 20 is visible. Here it can be seen that door assembly 20 includes a door 21 and a sound absorbing component 34. Sound absorbing component 34 is mounted to the underside of door 21. In the illustrated embodiment, sound absorbing component 34 has a rectangular configuration that substantially conforms to the rectangular configuration of the interior periphery of inlet duct 22. This configuration maximizes the area of sound absorbing component 34 and, correspondingly, maximizes the ability of sound absorbing component 34 to intercept sound generated by auxiliary power unit 12 as it emanates from end 24. This configuration also permits sound absorbing component 34 to fit entirely within end 24 when door assembly 20 is in the closed position. In other embodiments, sound absorbing component 34 may have a smaller configuration without departing from the teachings of the present disclosure. In other embodiments, the interior periphery of inlet duct 22 may comprise a shape other than rectangular. In such embodiments, sound absorbing component 34 may have a shape that conforms to such non-rectangular shape of the interior periphery of inlet duct 22. In still other embodiments, sound absorbing component 34 may have a periphery that does not conform to the interior periphery of inlet duct 22. In such embodiments where the periphery of sound absorbing component 34 does not conform to the inner periphery of inlet duct 22, it would be desirable for the periphery of sound absorbing component 34 to, nevertheless, fit entirely within the periphery of inlet duct 22 to ensure that door assembly 20 may be closed without obstruction.

In general, sound absorption is typically optimized when the acoustic impedance of the material matches the air impedance. For this reason, the choice of sound absorbing material plays a role in a sound absorber's effectiveness. In the present disclosure, sound absorbing component 34 may comprise any suitable sound deadening material including, but not limited to airflow resistive materials that are designed and/or constructed to absorb the high frequency noise of concern. Airflow resistive materials that are suitable for auxiliary power unit environments include, but are not limited to, felt metals, fiber metals, sintered metals, and wire cloth.

In some embodiments, sound absorbing component 34 may comprise a metal material. For example, steel, stainless steel, titanium, and/or aluminum. In other embodiments, the sound absorbing component may comprise any suitable woven metal material.

In addition to the sound absorbing components identified above, a tuned resonant sound absorber (such as a Helmholtz resonator) that is tuned to absorb the high frequency tone of interest may be employed as the sound absorbing component. Such a tuned resonant sound absorber may be constructed from perforated plate or perforated skin that is spaced a prescribed distance from door 21. The tuned resonant sound absorber can be constructed from metals, plastics, or any other suitable material or composite.

In addition to the choice of sound absorbing material, the positioning of the sound absorbing material plays a role in the effectiveness of the sound absorber. Maximum sound absorption at a particular frequency occurs when the cavity depth behind the resistive porous material is approximately one quarter of the wavelength for that frequency. Accordingly, the sound absorbing material may be spaced apart by a relatively precise distance from door 21. This arrangement advantageously permits for water drainage. However, in some applications, the cavity may be filled with a second sound absorbing material.

With continuing reference to FIGS. 1-3, FIG. 4 is a perspective view of end 24 of inlet duct 22 of inlet duct assembly 14 with door assembly 20 in a closed position. In this view, it can be observed that sound absorbing component 34 has not obstructed the closure of door assembly 20 and that, when door assembly 20 is closed, sound absorbing component 34 is completely concealed from view from the outside of aircraft 10.

Figure 5:
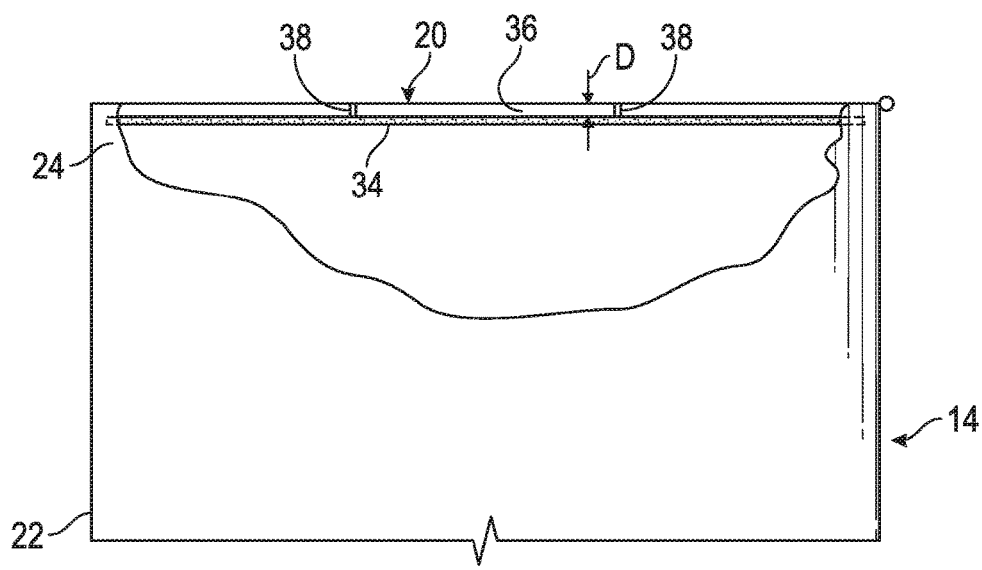
FIG. 5 is a fragmentary cut-away side view illustrating the portion of the inlet duct assembly and the inlet duct door assembly of FIG. 4.

FIG. 5 is a fragmentary, cut-away side view of end 24 of inlet duct 22 of inlet duct assembly 14. In this view, the spatial relationship between sound absorbing component 34 and the underside of door 21 can be observed. In the illustrated embodiment, sound absorbing component 34 is disposed in a spaced apart relationship with respect to door 21. Sound absorbing component 34 is disposed a distance D from the underside of door 21. By spacing sound absorbing component 34 apart from the underside of door 21, a chamber 36 is formed. Chamber 36 receives sound emanating from end 24 of inlet duct 22. In some embodiments, distance D may be approximately one quarter of the wavelength of the high frequency noise emanating from inlet duct 22. In other embodiments, distance D may be any suitable distance effective to dissipate the noise emanating from end 24.

Figure 6:
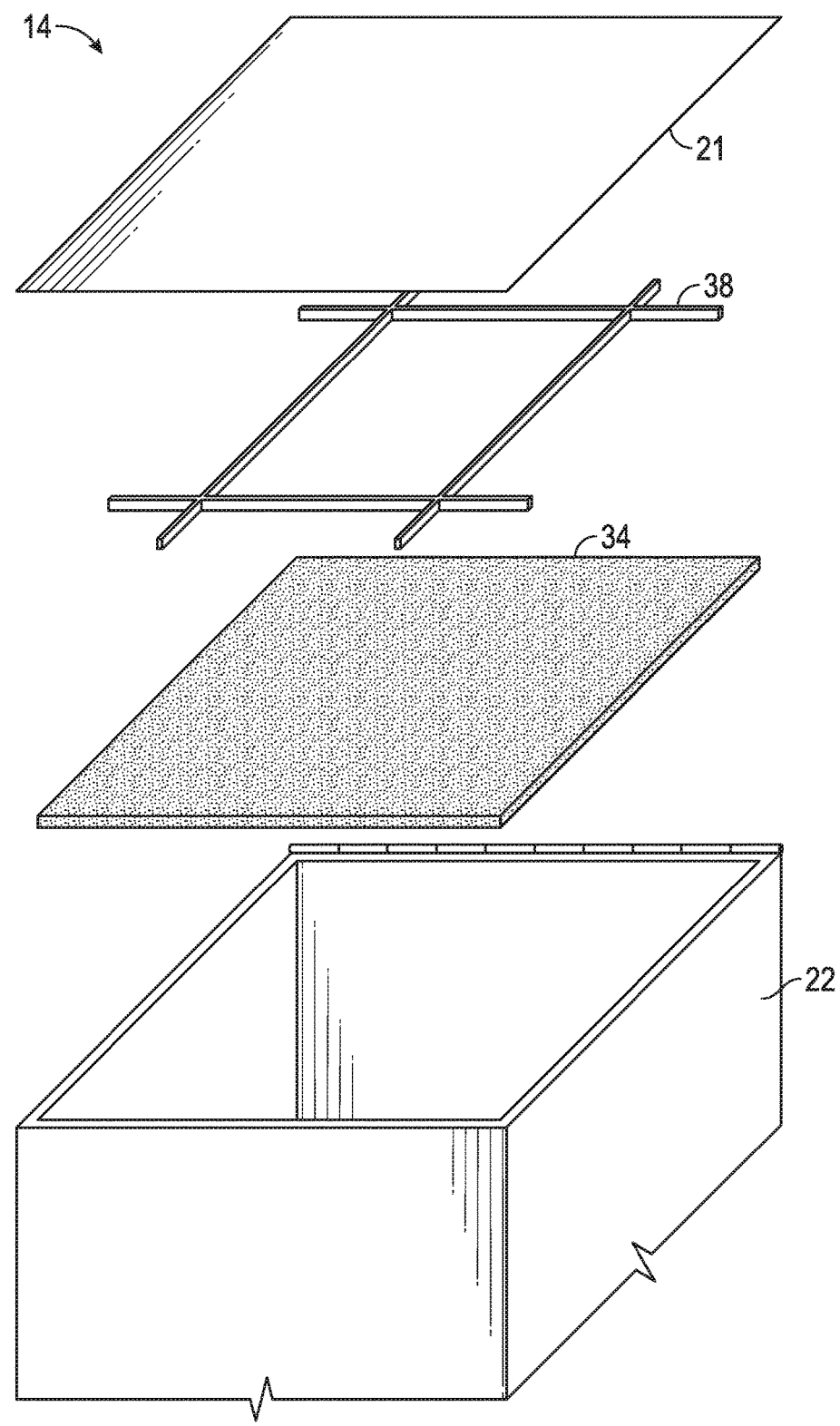
FIG. 6 is an exploded fragmentary view illustrating the portion of the inlet duct assembly and the inlet duct door assembly of FIG. 3.
Figure 7:
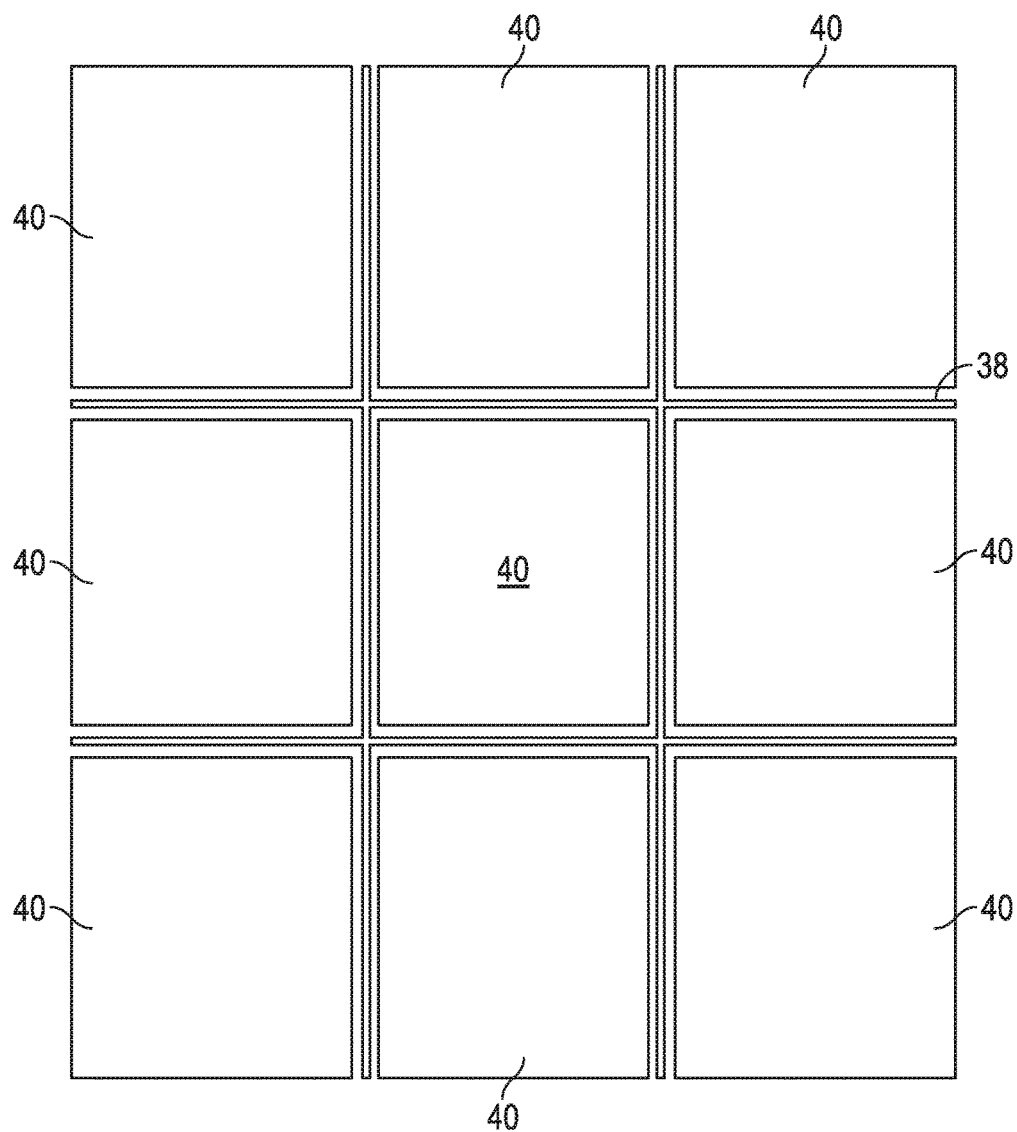
FIG. 7 is a plan view of a lattice stand-off structure and foam sound absorbing material for use with the inlet duct assembly and the inlet duct door assembly of FIGS. 1-6.

In the embodiment illustrated in FIG. 5, sound absorbing component 34 is held in a position that is spaced apart from the underside of door 21 by a stand-off component 38 (best seen in FIGS. 6 and 7). Stand-off component 38 has a lattice shaped configuration, the ends of which are visible in FIG. 5. In other embodiments, any other configuration for stand-off component 38 that is effective to support sound absorbing component 34 a distance D from the underside of door 21 may be employed without departing from the teachings of the present disclosure.

With continuing reference to FIGS. 1-5, FIG. 6 is a fragmentary exploded view illustrating inlet duct assembly 14. In this view, the arrangement of the major components of inlet duct assembly 14 can be seen. Stand-off component 38 is visible in FIG. 6 in its entirety. While stand-off component 38 has been illustrated in a three by three configuration, it should be understood that any other configuration that is effective to support sound absorbing component 34 in a spaced apart relationship with respect to door 21 and that does not substantially obstruct the nose from passing through sound absorbing component 34 may also be used. Door assembly 20 may be attached to inlet duct 22 in any suitable manner that permits door assembly 20 to move between an open and a closed position. For example, a hinge and a hydraulic actuator may be employed to move door assembly 20 between an open and a closed position.

FIG. 7 is a plan view illustrating stand-off component 38 together with a plurality of sound absorbing components 40. With continuing reference to FIGS. 1-6, the use of sound absorbing components 40 with door assembly 20 is optional and may enhance the ability of door assembly 20 to absorb sounds emanating from end 24 of inlet duct 22 of inlet duct assembly 14. Sound absorbing components 40 are configured to fit within the interstices of stand-off component 38 and to fill chamber 36. Sound absorbing components 40 may comprise any suitable material effective to absorb sound emanating from inlet duct assembly 14. In some embodiments, sound absorbing components may comprise a foam material or other porous structure that provides viscous damping to reduce the kinetic energy of the air molecules.

By positioning sound absorbing components 40 in chamber 36, further diminution of the sound emanating from inlet duct assembly 14 may be attained.

Figure 8:
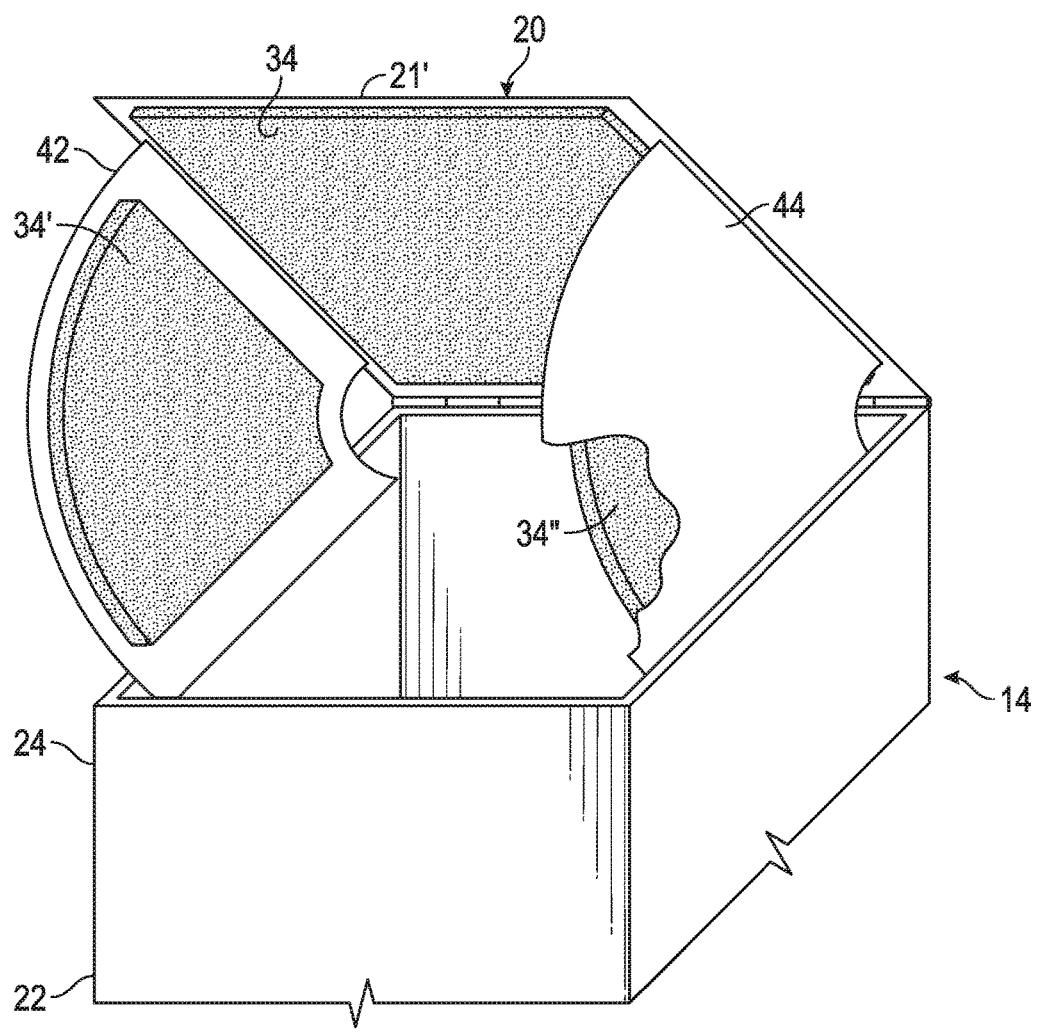
FIG. 8 is a perspective view illustrating the inlet duct of FIG. 2 equipped with a non-limiting alternate embodiment of a door.

With continuing reference to FIGS. 1-7, FIG. 8 illustrates inlet duct assembly 14 with an alternate embodiment of door 21 (in FIG. 8, the alternate embodiment is identified by reference numeral 21'). As illustrated door 21' includes a pair of spaced apart walls 42, 44 extending from an underside of door 21' and aligned with the direction of air flowing into inlet duct 22. The inclusion of pair of spaced apart walls 42, 44 permits door 21' to act as a scoop and to funnel ambient air from the freestream into inlet duct 22. Additionally, sound absorbing components 34' and 34" are mounted to the internal surfaces of spaced apart walls 42, 44, respectively to facilitate the absorption of sound by door assembly 20. In other embodiments, rather than employing two additional sound absorbing components such as sound absorbing components 34' and 34", door assembly may employ a single sound absorbing component that is configured to cover the internal surfaces of spaced apart walls 42 and 44 as well as the underside of door 21'. In still other embodiments of door 21', spaced apart walls 42 and 44 may be free of any sound absorbing components.

Figure 9:
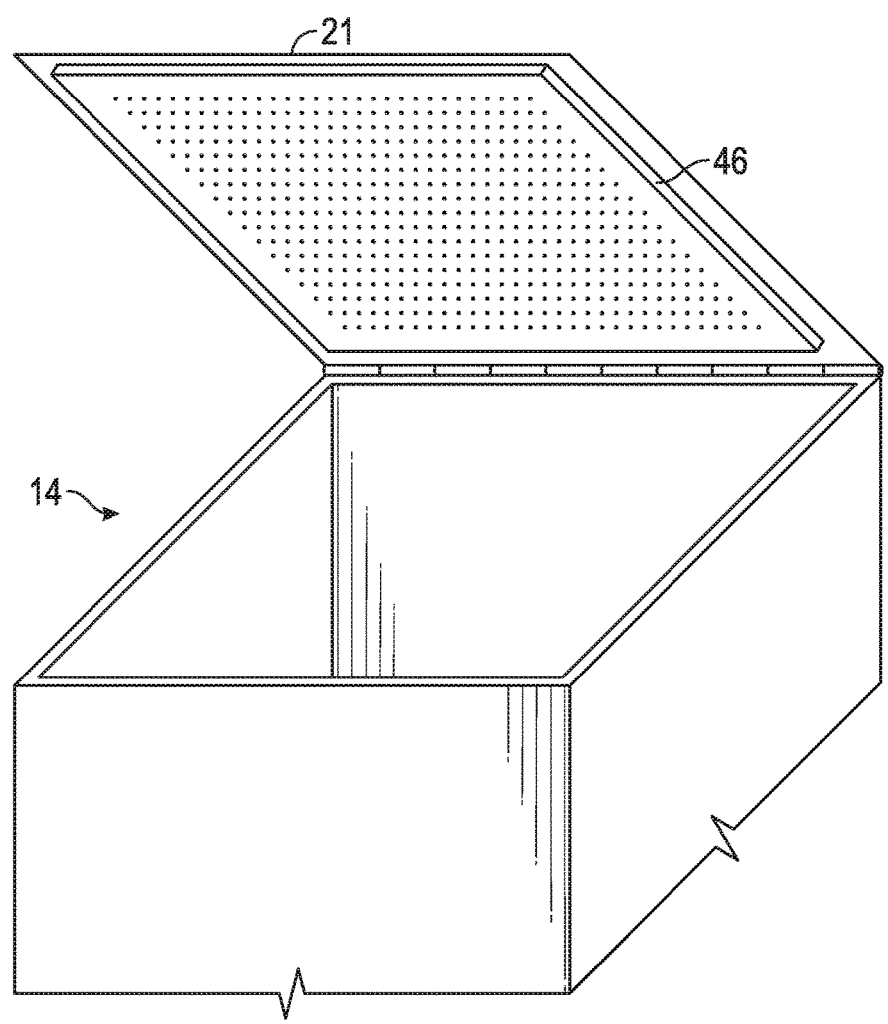
FIG. 9 is a perspective view of the inlet duct of FIG. 2 equipped with a non-limiting alternate embodiment of a sound absorbing component.

With continuing reference to FIGS. 1-8, FIG. 9 illustrates inlet duct assembly 14 equipped with an alternate embodiment of sound absorbing component 34 (in FIG. 9, the alternate embodiment is identified with the reference numeral 46). Sound absorbing component 46 is a tuned resonant sound absorber, such as a Helmholtz resonator. In some embodiments, sound absorbing component 46 may comprise a perforated plate with an air cavity behind it. In some embodiments, the air cavity may be dedicated to a single perforation while in other embodiments, the air cavity may be shared by some or all of the perforations. In some embodiments, sound absorbing component 46 may be spaced apart from door 21. In some embodiments, that distance may correspond with a quarter of the wavelength of the high frequency noise generated by auxiliary power unit 12. In other embodiments, because tuned resonant sound absorbers include an internal cavity, they may be mounted directly up against door 21.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An auxiliary power unit inlet assembly for use with an auxiliary power unit on an aircraft, the auxiliary power unit inlet assembly comprising:
    an inlet duct having a first end and a second end, the first end configured for coupling to the auxiliary power unit;
    a door associated with the second end of the inlet duct, the door configured to move between a first position and a second position, the door closing the second end of the inlet duct when the door is in the first position and the door permitting air to enter the second end of the inlet duct when the door is in the second position; and
    a sound absorbing component mounted to the door and disposed proximate the inlet duct, the sound absorbing component positioned at a location on the door such that a noise generated by the auxiliary power unit will impinge on the sound absorbing component.

2. The auxiliary power unit inlet assembly of claim 1, wherein the door includes a pair of spaced apart walls extending transversely from the door and oriented in a direction substantially aligned with a direction of airflow entering the second end of the inlet duct.

3. The auxiliary power unit inlet assembly of claim 2, wherein the sound absorbing component is further mounted to an internal side of each wall of the pair of spaced apart walls.

4. The auxiliary power unit inlet assembly of claim 1, wherein the sound absorbing component comprises a metal felt material.

5. The auxiliary power unit inlet assembly of claim 1, wherein the sound absorbing component comprises a tuned resonant sound absorber.

6. The auxiliary power unit inlet assembly of claim 5, wherein the tuned resonant sound absorber comprises a perforated plate having an airspace disposed to the rear of the perforated plate.

7. The auxiliary power unit inlet assembly of claim 1, wherein the sound absorbing component is mounted to the door in a spaced apart manner.

8. The auxiliary power unit inlet assembly of claim 7, wherein the sound absorbing component is mounted to the door by a stand-off component.

9. The auxiliary power unit inlet assembly of claim 8, wherein the stand-off component comprises a lattice structure.

10. The auxiliary power unit inlet assembly of claim 7 wherein the sound absorbing component is spaced apart from the door by a distance that corresponds with a frequency of the noise generated by the auxiliary power unit.

11. The auxiliary power unit inlet assembly of claim 10, wherein the distance is less than approximately one quarter of a wavelength of the noise generated by the auxiliary power unit.

12. The auxiliary power unit inlet assembly of claim 10, wherein the distance is less than one half of an inch.

13. The auxiliary power unit inlet assembly of claim 1, further comprising a foam material disposed between the sound absorbing component and the door.

14. An auxiliary power unit inlet door assembly for use with an auxiliary power unit inlet duct of an auxiliary power unit on an aircraft, the auxiliary power unit inlet door assembly comprising:
    a door configured for mounting proximate the auxiliary power unit inlet duct, the door configured to move between a first position and a second position when the door is mounted proximate the auxiliary power unit inlet duct, the door closing the auxiliary power unit inlet duct when the door is in the first position and the door permitting air to enter the auxiliary power unit inlet duct when the door is in the second position; and
    a sound absorbing component mounted to the door and disposed proximate the auxiliary power unit inlet duct when the door is mounted proximate the auxiliary power unit inlet duct, the sound absorbing component positioned at a location on the door such that a noise generated by the auxiliary power unit will impinge on the sound absorbing component when the door is mounted proximate the auxiliary power unit inlet duct.

15. The auxiliary power unit inlet door assembly of claim 14, wherein the sound absorbing component comprises a metal felt material.

16. The auxiliary power unit inlet door assembly of claim 14, wherein the sound absorbing component comprises a tuned resonant sound absorber.

17. The auxiliary power unit inlet door assembly of claim 14, wherein the sound absorbing component is mounted to the door in a spaced apart manner.

18. The auxiliary power unit inlet door assembly of claim 16, wherein the sound absorbing component is spaced apart from the door by a distance of not greater than one quarter of a wavelength of the noise.

19. The auxiliary power unit inlet door assembly of claim 14, wherein the door includes a pair of spaced apart walls extending transversely from the door and oriented in a direction substantially aligned with a direction of airflow entering the second end of the inlet duct.

20. The auxiliary power unit inlet door assembly of claim 19, wherein the sound absorbing component is further mounted to an internal side of each wall of the pair of spaced apart walls.

* * * * *